US00RE39328E

(19) United States
(12) Reissued Patent
Fimeri

(10) Patent Number: US RE39,328 E
(45) Date of Reissued Patent: Oct. 10, 2006

(54) MIRROR CARRIER MOUNTING ARRANGEMENT FOR A VEHICLE REAR VIEW MIRROR

(75) Inventor: Garry Gordon Leslie Fimeri, Morphettvale (AU)

(73) Assignee: Schefenacker Vision Systems Australia Pty Ltd., Lonsdale (AU)

(21) Appl. No.: 10/125,730

(22) Filed: Apr. 17, 2002

Related U.S. Patent Documents

Reissue of:
(64) Patent No.: 6,050,537
Issued: Apr. 18, 2000
Appl. No.: 09/018,418
Filed: Feb. 4, 1998

(30) Foreign Application Priority Data

Feb. 6, 1997 (GB) ..... 9702401

(51) Int. Cl.
*A47G 1/24* (2006.01)

(52) U.S. Cl. ..... 248/481
(58) Field of Classification Search ..... 248/475.1, 248/476, 479, 481; 359/872, 877
See application file for complete search history.

(56) References Cited

U.S. PATENT DOCUMENTS 4,640,142 A * 2/1987 Cummins et al.
4,764,004 A * 8/1988 Yamada et al. ..... 359/872
4,863,255 A * 9/1989 Seitz ..... 359/841
4,981,279 A * 1/1991 Andreas et al. ..... 248/483
5,274,505 A * 12/1993 Nagayama et al. ..... 359/874
5,311,368 A * 5/1994 Tsuyama ..... 359/872
5,363,246 A * 11/1994 Perry et al. ..... 359/874
5,473,476 A * 12/1995 Fujita ..... 359/872

FOREIGN PATENT DOCUMENTS

| | | | | |
|---|---|---|---|---|
| EP | 0272047 | * | 6/1988 | |
| EP | 0839687 A1 | | 5/1998 | |
| FR | 2594391 | * | 8/1987 | ..... 359/872 |
| GB | 2217665 | | 4/1989 | |
| JP | 57352 | * | 3/1988 | ..... 359/872 |
| WO | WO 94/26556 | * | 11/1994 | |

* cited by examiner

*Primary Examiner*—Ramon O Ramirez
(74) *Attorney, Agent, or Firm*—Warn, Hoffmann, Miller & LaLone, P.C.

(57) ABSTRACT

A rear view mirror for a motor vehicle comprising a case containing a mounting platform which has a concave part-spherical recess. A reflective member is secured to a mirror carrier which has a hollow projection with a part-spherical outer surface dimensioned to be a sliding fit in the recess a part-spherical inner surface and a diametrically oriented slot. A stem is secured to the mounting platform so as to project from the center of the recess and has a T-shaped crosshead dimensioned to pass through the slot when aligned therewith and to engage with the part-spherical inner surface of the hollow projection when aligned transversely to the slot. A lever on the mounting platform engages with a slot in the mirror carrier to prevent relative angular movement between the mirror carrier and the mounting platform about said stem.

63 Claims, 3 Drawing Sheets

MIRROR CARRIER MOUNTING ARRANGEMENT FOR A VEHICLE REAR VIEW MIRROR

Matter enclosed in heavy brackets [ ] appears in the original patent but forms no part of this reissue specification; matter printed in italics indicates the additions made by reissue.

FIELD

This invention relates to a rear view mirror for a motor vehicle of the type comprising a case containing a mounting platform, a reflective member mounted on a mirror carrier, a pivot joint for pivotally supporting the mirror carrier on the mounting platform for angular movement relative to the case, and retention means for retaining the reflective member in a desired orientation relative to the case.

RELATED ART

The invention is particularly but not exclusively applicable to a rear view mirror in which the retention means comprise drive means for adjusting the orientation of the reflective member. For example the drive means may be a unit housed within the mounting platform and having electric motors driving jacking screws, as described in EP-A-0272047.

SUMMARY OF THE INVENTION

It is an object of the invention to provide a rear view mirror of the above type in which the mirror carrier and the pivot joint are constructed so as to facilitate manufacture.

According to the invention, in one aspect, in a rearview mirror of the type described above, the pivot joint comprises:

a concave part-spherical recess on the mounting platform, a hollow projection on the mirror carrier having a part-spherical outer surface dimensioned to be a sliding fit in the recess, a part-spherical inner surface, and a diametrically oriented slot, a stem secured to the mounting platform so as to project from the center of the recess and having a T-shaped cross-head dimensioned to pass through the slot when aligned therewith and to engage with the part-spherical inner surface of the hollow projection when aligned transversely to the slot, thereby to prevent separation of the mirror carrier from the mounting platform, and anti-rotation means engageable between the mirror carrier and the mounting platform to prevent relative angular movement between the mirror carrier and the mounting platform about said stem.

According to the invention, in another aspect, in a rearview mirror of the type described above, the reflective member is secured to a backing plate having an annular flange adapted to be a snap fit on a corresponding flange on the periphery of the mirror carrier.

DETAILED DESCRIPTION OF THE PREFERRED EMBODIMENT

Figure 1:
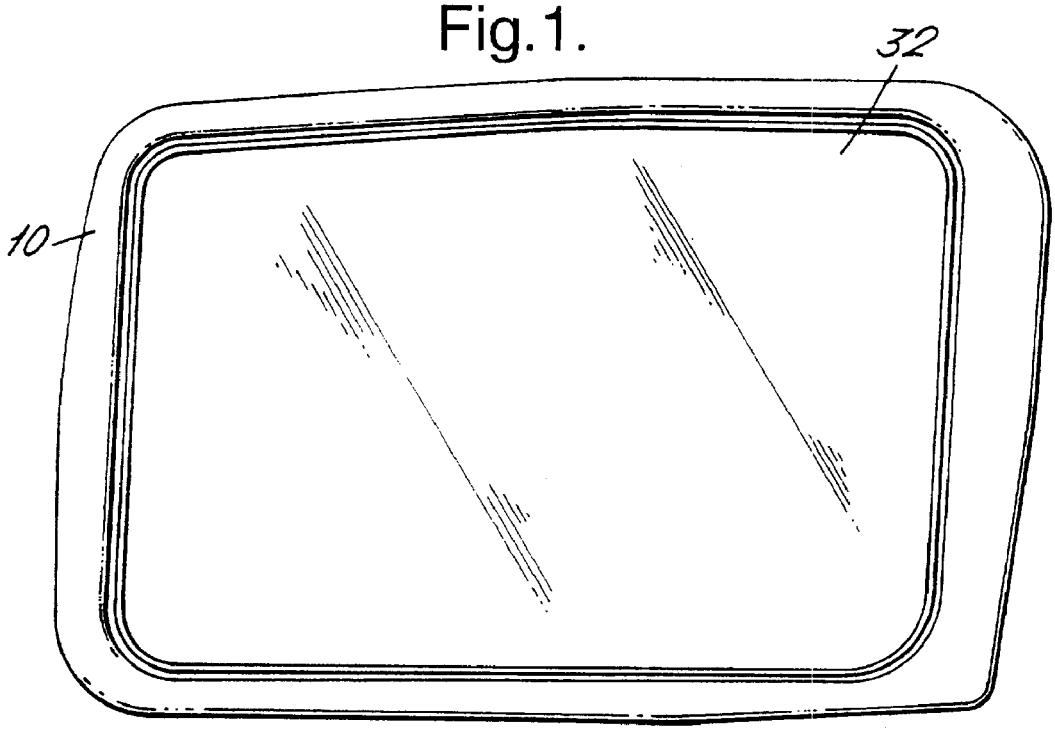
FIG. 1 is an elevation of a vehicle rear view mirror in accordance with the invention, viewed in a rearward direction with respect to a motor vehicle on which it is mounted.
Figure 2:
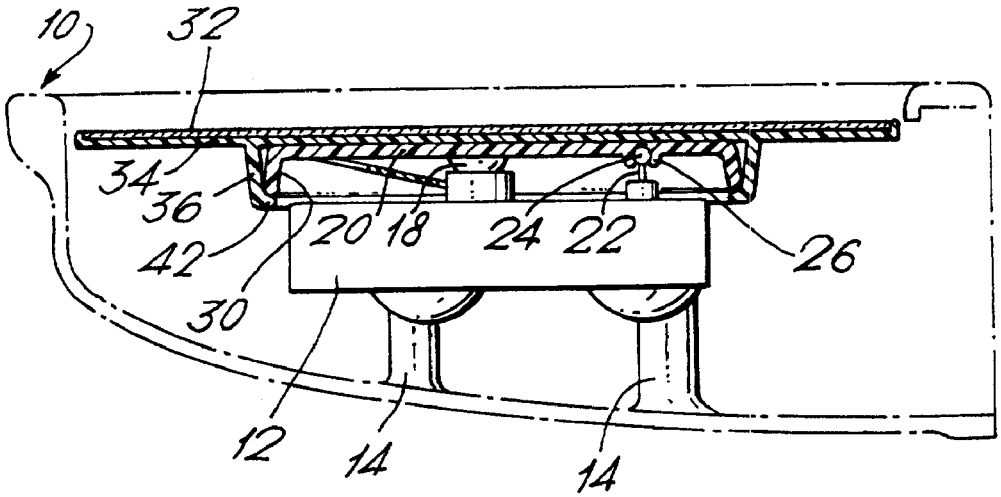
FIG. 2 is a schematic part-sectional plan view from below of the mirror shown in FIG. 1.

Referring to FIGS. 1 and 2, a rear view mirror assembly comprises a mirror case 10 within which an adjustment mechanism housing 12 is mounted on three pillars 14, two of which are visible in FIG. 2. The housing 12 serves as a mounting platform, having a part-spherical socket 16 formed integrally on its rearwardly (outwardly) facing surface. The socket 16 supports a ball element 18 which is formed on a mirror carrier 20.

A pair of jacking screws 22 (one of which is visible in FIG. 2) project from the housing 12 and have ball elements 24 on their outer ends which engage in respective sockets 26 in the mirror carrier 20, for effecting angular movement of the mirror carrier 20 about two mutually orthogonal axes as described in EP-A-0272047.

Figure 3:
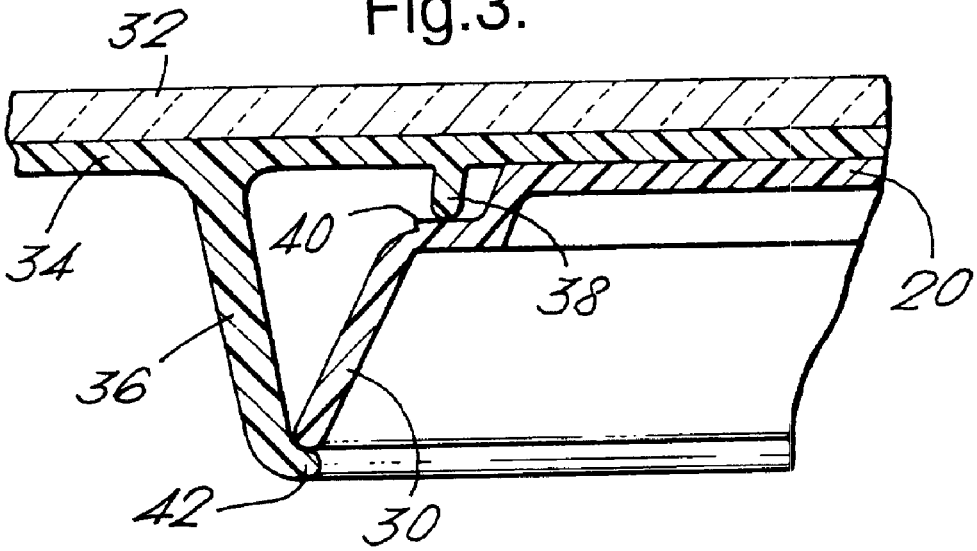
FIG. 3 is a scrap sectional view on the same plane as the corresponding part of FIG. 2, but to an enlarged scale.

As can be seen in FIGS. 2 and 3, the mirror carrier 20 has a convex annular flange 30 extending round its periphery and facing towards the housing 12. A reflective member 32 is secured to one side of a backing plate 34, the other side of which has a concave annular flange 36 dimensioned to surround the flange 30. An annular rib 38 projects from the backing plate 34, within the area bounded by the concave flange 36, and abuts against a shoulder 40 on the mirror carrier 20. The concave flange 36 has an inwardly facing bead 42 on its lower edge (as viewed in FIG. 2) adapted to be a snap fit round the corresponding edge of the convex flange 30.

Figure 4:
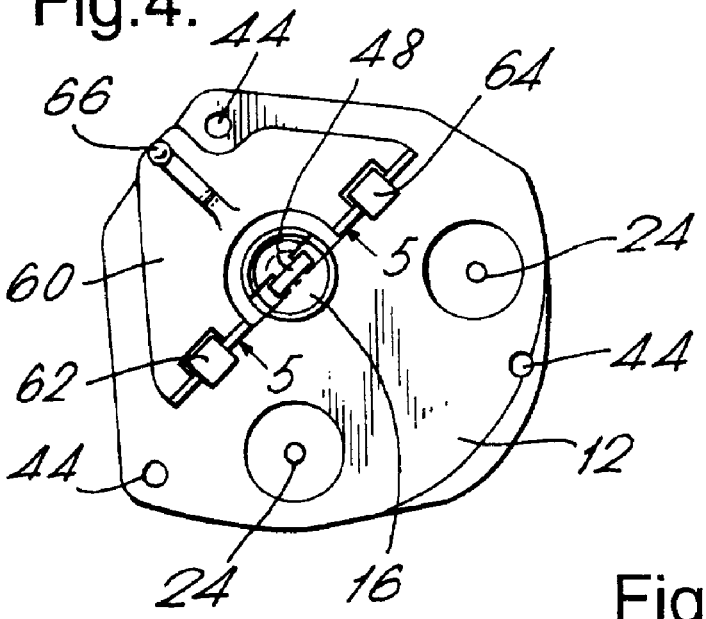
FIG. 4 is an elevation, from the same direction as FIG. 1, of the mounting platform of the mirror shown in FIG. 1.
Figure 5:
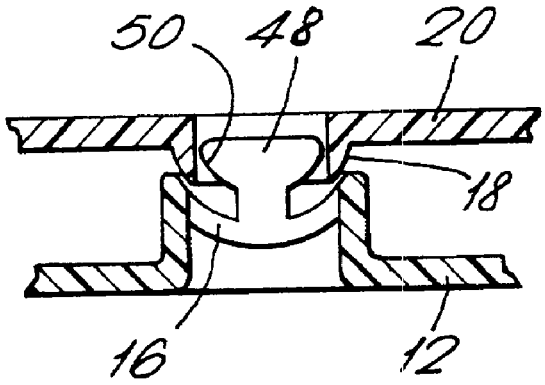
FIG. 5 is a scrap section sectional view on the line 5—5 in FIG. 4, additionally showing the mirror carrier of FIG. 4 in an intermediate stage of assembly on the mounting platform.

Referring to FIGS. 4 and 5, the housing 12 has three holes 44 for receiving screws 46 (FIG. 7) to secure the housing 12 to the three pillars 14 within the mirror case 10. A T-shaped stem 48 projects radially inwardly from the center of the part-spherical socket 16. The head of the T-shaped stem 48 is of semicircular cross-section, having its convex surface 50 concentric with the socket 16.

Figure 6:
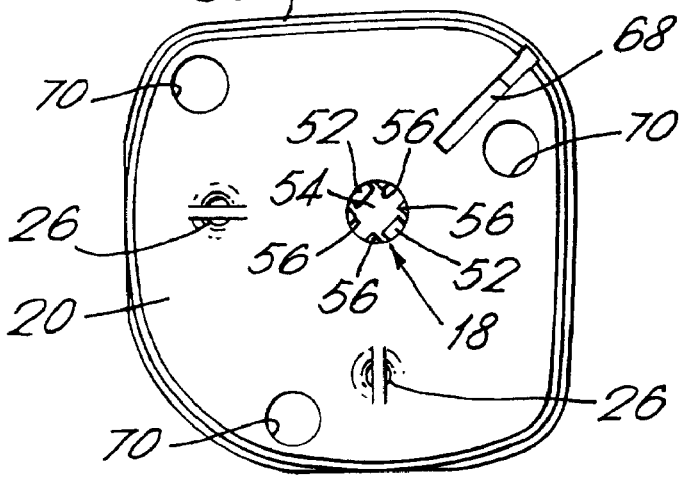
FIG. 6 is an elevation, from the same direction as FIG. 1, of the mirror carrier, prior to assembly on the mounting platform.
Figure 7:
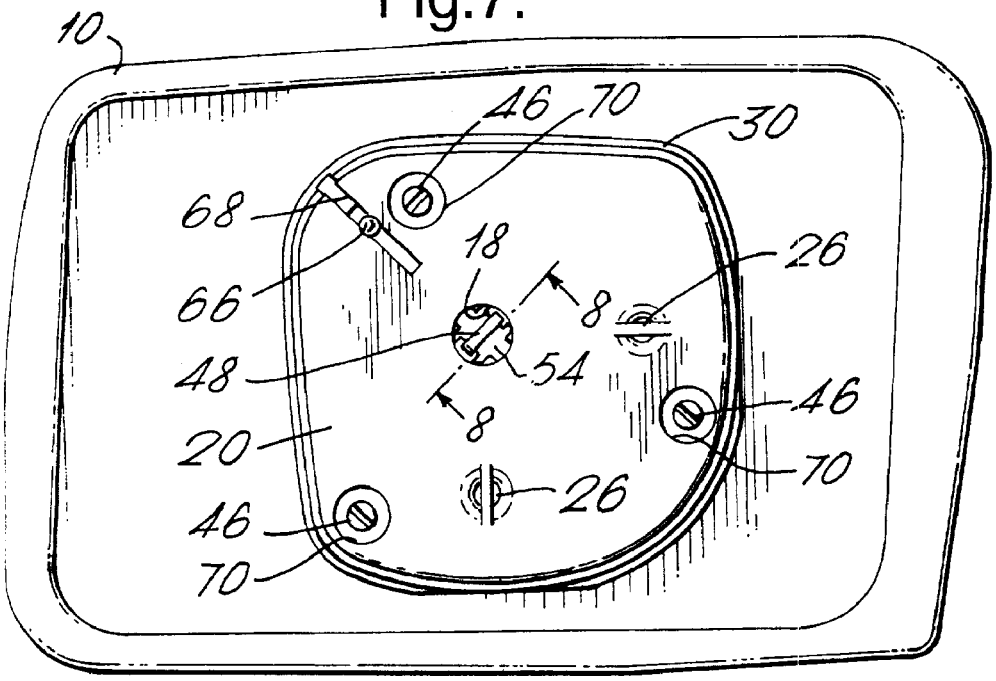
FIG. 7 is an elevation similar to FIG. 1 but with the reflective member removed.
Figure 8:
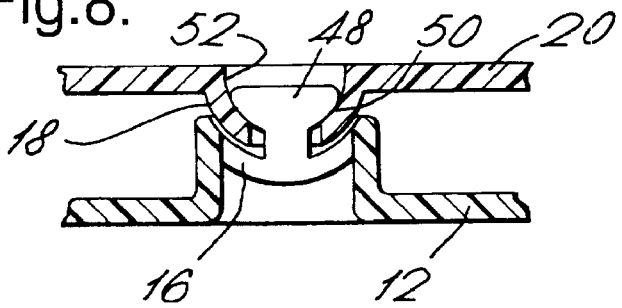
FIG. 8 is a scrap section sectional view on the line 8—8 in FIG. 7.

Turning to FIGS. 6, 7 and 8, the ball element 18 on the mirror carrier 20 is hollow, having a concave hemispherical interior surface 52 concentric with its outer surface and of substantially the same radius as the convex surface 50 of the cross-head of the stem 48. A diametrical slot 54 extends across the ball element 18 and allows the head of the T-shaped stem 48 to pass therethrough when the housing 12 and mirror carrier 20 are in the relative orientation illustrated in FIGS. 4 to 6.

If the mirror carrier 20 is turned through [900] *90°* relative to the housing 12, to the orientation illustrated in FIGS. 7 and 8, the convex surface 50 on the stem 48 engages with the concave surface 52 of the hollow ball element 18 so as to retain the mirror carrier 20 captive on the housing 12.

As can be seen in FIG. 6, additional cut-outs are provided in the ball element 18 so as to form four triangular tabs 56, the tips of which are proud of the outer convex surface of the ball element 18 so as to be in resilient frictional engagement with the concave surface of the socket 16.

In order to retain the mirror carrier 20 in the orientation shown in FIGS. 7 and 8, a Y-shaped coupling lever 60 (FIG. 4) has the ends of its branch limbs connected to the housing 12 by hinges 62 and 64 which are located on diametrically opposite sides of the socket 16 in alignment with the head of the stem 48. On its other end, the lever 60 carries a ball element 66 which is a snap-fit engagement in a slot 68 in the mirror carrier 20. The slot 68 has concave side walls so as to retain the ball element 66 in engagement.

During assembly, the mirror carrier 20 is first assembled on the housing 12 as described above. When the mirror carrier 20 has been turned to the orientation shown in FIG. 7, three holes 70 therein are in alignment with the holes 50 in the housing 12, allowing the screws 46 to be inserted so as to secure the housing 12 on the pillars 14 in the mirror case 10. Finally, the backing plate 34 is snapped on to the mirror carrier 20 as illustrated in FIG. 2.

What is claimed is:

1. A rear view mirror for a motor vehicle comprising a case containing a mounting platform, a reflective member mounted on a mirror carrier, a pivot joint for pivotally supporting the mirror carrier on the mounting platform for angular movement relative to the case, and retention means for retaining the reflective member in a desired orientation relative to the case, wherein the pivot joint comprises:

a concave part-spherical recess on the mounting platform, a hollow projection on the mirror carrier having a part-spherical outer surface dimensioned to be a sliding fit in the recess, a part-spherical inner surface, and a diametrically oriented slot, a stem secured to the mounting platform so as to project from the center of the recess and having a T-shaped crosshead dimensioned to pass through the slot when aligned therewith and to engage with the part-spherical inner surface of the hollow projection when aligned transversely to the slot, thereby to prevent separation of the mirror carrier from the mounting platform, and anti-rotation means engageable between the mirror carrier and the mounting platform to prevent relative angular movement between the mirror carrier and the mounting platform about said stem.

2. A rear view mirror for a motor vehicle comprising a case containing a mounting platform, a reflective member mounted on a mirror carrier, a pivot joint for pivotally supporting the mirror carrier on the mounting platform for angular movement relative to the case, and retention means for retaining the reflective member in a desired orientation relative to the case, wherein the pivot joint comprises:

a concave part-spherical recess on the mounting platform, a hollow projection on the mirror carrier having a part-spherical outer surface dimensioned to be a sliding fit in the recess, a part-spherical inner surface, and a diametrically oriented slot, a stem secured to the mounting platform so as to project from the centre of the recess and having a T-shaped crosshead dimensioned to pass through the slot when aligned therewith and to engage with the part-spherical inner surface of the hollow projection when aligned transversely to the slot, thereby to prevent separation of the mirror carrier from the mounting platform, and anti-rotation means engageable between the mirror carrier and the mounting platform to prevent relative angular movement between the mirror carrier and the mounting platform about said stem, said anti-rotation means includes a lever having a first coupling connecting it to the mounting platform and a second coupling connecting it to the mirror carrier, one of said first and second couplings allowing relative angular movement between said lever and one of said mounting platform and said mirror carrier only about a first pivot axis and the other of said couplings comprising a slider engaging in an elongated track which extends perpendicular to said first pivot axis, said slider also allowing angular movement between said lever and the other of said mounting platform and said mirror carrier relative to said track both about an axis parallel to said first pivot axis and about an axis parallel to said track.

3. A rear view mirror according to claim 2, wherein the reflective member is secured to a backing plate having an annular flange snap fitted on a corresponding flange on the mirror carrier.

4. A rear view mirror for a motor vehicle comprising a case containing a mounting platform, a reflective member mounted on a mirror carrier, a pivot joint for pivotally supporting the mirror carrier on the mounting platform for angular movement relative to the case, and retention means for retaining the reflective member in a desired orientation relative to the case, wherein the pivot joint comprises:

a concave part-spherical recess on the mounting platform, a hollow projection on the mirror carrier having a part-spherical outer surface dimensioned to be a sliding fit in the recess, a part-spherical inner surface, and a diametrically oriented slot, a stem secured to the mounting platform so as to project from the centre of the recess and having a T-shaped crosshead dimensioned to pass through the slot when aligned therewith and to engage with the part-spherical inner surface of the hollow projection when aligned transversely to the slot, thereby to prevent separation of the mirror carrier from the mounting platform, and anti-rotation means engageable between the mirror carrier and the mounting platform to prevent relative angular movement between the mirror carrier and the mounting platform about said stem, said reflective member is secured to a backing plate having an annular flange, said mirror carrier includes a flange, said annular flange being snap fitted to said flange on the mirror carrier.

5. A rear view mirror according to claim 4, wherein the flange on the backing plate is concave and has an inwardly directed lip engaging the edge of the flange on the mirror carrier.

6. A rear view mirror according to claim 4, wherein the flange on the mirror carrier is convex.

7. A rear view mirror for a motor vehicle, comprising:

a case containing a mounting platform, a backing plate having an annular flange, a reflective member mounted on the backing plate, a mirror carrier having a convex annular flange, a pivot joint for pivotally supporting the mirror carrier on the mounting platform for angular movement relative to the case, and retention means for retaining the reflective member in a desired orientation relative to the case, the annular flange on the backing plate being snap fitted on the annular flange on the mirror carrier.

8. A rear view mirror according to claim 7, wherein the flange on the backing plate is concave and has an inwardly directed lip engaging the edge of the flange on the mirror carrier.

*9. A rear view mirror for a motor vehicle comprising a case containing a mounting platform, a reflective member mounted on a mirror carrier, a pivot joint for pivotally supporting the mirror carrier on the mounting platform for angular movement relative to the case, and a retainer mechanism retaining the reflective member in a desired orientation relative to the case, wherein the pivot joint comprises:*

*a concave part-spherical recess on the mounting platform,*

*a hollow projection on the mirror carrier having a part-spherical outer surface dimensioned to be a sliding fit in the recess, a part-spherical inner surface, and a diametrically oriented slot,*

*a stem secured to the mounting platform so as to project from the center of the recess and having a T-shaped crosshead dimensioned to pass through the slot when aligned therewith and to engage with the part-spherical inner surface of the hollow projection when aligned transversely to the slot, thereby to prevent separation of the mirror carrier from the mounting platform, and*

*an anti-rotation mechanism engageable between the mirror carrier and the mounting platform to prevent relative angular movement between the mirror carrier and the mounting platform about the stem.*

*10. A rear view mirror for a motor vehicle comprising a case containing a mounting platform, a reflective member mounted on a mirror carrier, a pivot joint for pivotally supporting the mirror carrier on the mounting platform for angular movement relative to the case, and a retainer mechanism retaining the reflective member in a desired orientation relative to the case, wherein the pivot joint comprises:*

*a concave part-spherical recess on the mounting platform,*

*a hollow projection on the mirror carrier having a part-spherical outer surface dimensioned to be a sliding fit in the recess, a part-spherical inner surface, and a diametrically oriented slot,*

*a stem secured to the mounting platform so as to project from the center of the recess and having a T-shaped crosshead dimensioned to pass through the slot when aligned therewith and to engage with the part-spherical inner surface of the hollow projection when aligned transversely to the slot, thereby to prevent separation of the mirror carrier from the mounting platform, and*

*an anti-rotation mechanism engageable between the mirror carrier and the mounting platform to prevent relative angular movement between the mirror carrier and the mounting platform about the stem,*

*the anti-rotation mechanism includes a lever having a first coupling connecting it to the mounting platform and a second coupling connecting it to the mirror carrier, one of the first and second couplings allowing relative angular movement between the lever and one of the mounting platform and the mirror carrier only about a first pivot axis and the other of the couplings comprising a slider engaging in an elongated track which extends perpendicular to the first pivot axis, the slider also allowing angular movement between the lever and the other of the mounting platform and the mirror carrier relative to the track both about an axis parallel to the first pivot axis and about an axis parallel to the track.*

*11. A rear view mirror according to claim 10, wherein the reflective member is secured to a backing plate having an annular flange snap fitted on a corresponding flange on the mirror carrier.*

*12. A rear view mirror for a motor vehicle comprising a case containing a mounting platform, a reflective member mounted on a mirror carrier, a pivot joint for pivotally supporting the mirror carrier on the mounting platform for angular movement relative to the case, and a retainer mechanism retaining the reflective member in a desired orientation relative to the case, wherein the pivot joint comprises:*

*a concave part-spherical recess on the mounting platform,*

*a hollow projection on the mirror carrier having a part-spherical outer surface dimensioned to be a sliding fit in the recess, a part-spherical inner surface, and a diametrically oriented slot,*

*a stem secured to the mounting platform so as to project from the center of the recess and having a T-shaped crosshead dimensioned to pass through the slot when aligned therewith and to engage with the part-spherical inner surface of the hollow projection when aligned transversely to the slot, thereby to prevent separation of the mirror carrier from the mounting platform, and*

*an anti-rotation mechanism engageable between the mirror carrier and the mounting platform to prevent relative angular movement between the mirror carrier and the mounting platform about the stem,*

*the reflective member is secured to a backing plate having an annular flange, the mirror carrier includes a flange, the annular flange being snap fitted to the flange on the mirror carrier.*

*13. A rear view mirror according to claim 12, wherein the flange on the backing plate is concave and has an inwardly directed lip engaging the edge of the flange on the mirror carrier.*

*14. A rear view mirror according to claim 12, wherein the flange on the mirror carrier is convex.*

*15. A rear view mirror for a motor vehicle comprising:*

*a case containing a mounting platform,*

*a backing plate having an annular flange,*

*a reflective member mounted on the backing plate,*

*a mirror carrier having a convex annular flange,*

*a pivot joint for pivotally supporting the mirror carrier on the mounting platform for angular movement relative to the case, and*

*a retainer mechanism retaining the reflective member in a desired orientation relative to the case,*

*the annular flange on the backing plate being snap fitted on the annular flange on the mirror carrier.*

*16. A rear view mirror according to claim 15, wherein the flange on the backing plate is concave and has an inwardly directed lip engaging the edge of the flange on the mirror carrier.*

*17. A rear view mirror for a motor vehicle comprising a case containing a mounting platform, a reflective member mounted on a mirror carrier, a pivot joint for pivotally supporting the mirror carrier on the mounting platform for angular movement relative to the case, and a retainer mechanism for retaining the reflective member in a desired orientation relative to the case, wherein the pivot joint comprises:*

*a concave part-spherical recess on the mounting platform,*

*a hollow projection on the mirror carrier having a part-spherical outer surface dimensioned to be a sliding fit in the recess, a part-spherical inner surface, and a diametrically oriented slot,*

*a stem secured to the mounting platform so as to project from the center of the recess and having a T-shaped crosshead dimensioned to pass through the slot when aligned therewith and to engage with the part-spherical inner surface of the hollow projection when aligned transversely to the slot, thereby to prevent separation of the mirror carrier from the mounting platform, and*

*an anti-rotation coupling mechanism engageable between the mirror carrier and the mounting platform to prevent relative angular movement between the mirror carrier and the mounting platform about the stem.*

*18. A rear view mirror for a motor vehicle comprising a case containing a mounting platform, a reflective member mounted on a mirror carrier, a pivot joint for pivotally supporting the mirror carrier on the mounting platform for angular movement relative to the case, and a retainer mechanism for retaining the reflective member in a desired orientation relative to the case, wherein the pivot joint comprises:*

*a concave part-spherical recess on the mounting platform,*

*a hollow projection on the mirror carrier having a part-spherical outer surface dimensioned to be a sliding fit in the recess, a part-spherical inner surface, and a diametrically oriented slot,*

*a stem secured to the mounting platform so as to project from the center of the recess and having a T-shaped crosshead dimensioned to pass through the slot when aligned therewith and to engage with the part-spherical inner surface of the hollow projection when aligned transversely to the slot, thereby to prevent separation of the mirror carrier from the mounting platform, and*

*an anti-rotation coupling mechanism engageable between the mirror carrier and the mounting platform to prevent relative angular movement between the mirror carrier and the mounting platform about the stem,*

*the anti-rotation coupling mechanism includes a lever having a first coupling connecting it to the mounting platform and a second coupling connecting it to the mirror carrier, one of the first and second couplings allowing relative angular movement between the lever and one of the mounting platform and the mirror carrier only about a first pivot axis and the other of the couplings comprising a slider engaging in an elongated track which extends perpendicular to the first pivot axis, the slider also allowing angular movement between the lever and the other of the mounting platform and the mirror carrier relative to the track both about an axis parallel to the first pivot axis and about an axis parallel to the track.*

*19. A rear view mirror according to claim 18, wherein the reflective member is secured to a backing plate having an annular flange snap fitted on a corresponding flange on the mirror carrier.*

*20. A rear view mirror for a motor vehicle comprising a case containing a mounting platform, a reflective member mounted on a mirror carrier, a pivot joint for pivotally supporting the mirror carrier on the mounting platform for angular movement relative to the case, and a retainer mechanism for retaining the reflective member in a desired orientation relative to the case, wherein the pivot joint comprises:*

*a concave part-spherical recess on the mounting platform,*

*a hollow projection on the mirror carrier having a part-spherical outer surface dimensioned to be a sliding fit in the recess, a part-spherical inner surface, and a diametrically oriented slot,*

*a stem secured to the mounting platform so as to project from the center of the recess and having a T-shaped crosshead dimensioned to pass through the slot when aligned therewith and to engage with the part-spherical inner surface of the hollow projection when aligned transversely to the slot, thereby to prevent separation of the mirror carrier from the mounting platform, and*

*an anti-rotation coupling mechanism engageable between the mirror carrier and the mounting platform to prevent relative angular movement between the mirror carrier and the mounting platform about the stem,*

*the reflective member is secured to a backing plate having an annular flange, the mirror carrier includes a flange, the annular flange being snap fitted to the flange on the mirror carrier.*

*21. A rear view mirror according to claim 20, wherein the flange on the backing plate is concave and has an inwardly directed lip engaging the edge of the flange on the mirror carrier.*

*22. A rear view mirror according to claim 21, wherein the flange on the mirror carrier is convex.*

*23. A rear view mirror for a motor vehicle comprising:*

*a case containing a mounting platform,*

*a backing plate having an annular flange,*

*a reflective member mounted on the backing plate,*

*a mirror carrier having a convex annular flange,*

*a pivot joint for pivotally supporting the mirror carrier on the mounting platform for angular movement relative to the case, and*

*a retainer mechanism for retaining the reflective member in a desired orientation relative to the case,*

*the annular flange on the backing plate being snap fitted on the annular flange on the mirror carrier.*

*24. A rear view mirror according to claim 23, wherein the flange on the backing plate is concave and has an inwardly directed lip engaging the edge of the flange on the mirror carrier.*

*25. A rear view mirror for a motor vehicle comprising:*

*a case containing a mounting platform,*

*a backing plate having at least one rib member and at least one flange member,*

*a reflective member mounted on the backing plate, and*

*a mirror carrier having a shoulder portion and a convex flange member,*

*the at least one flange member on the backing plate being snap fitted on the convex flange on the mirror carrier and the at least one rib member on the backing plate engages the shoulder portion of the mirror carrier during snap fitting.*

*26. The rear view mirror of claim 25, wherein the at least one rib member of the backing plate annularly engages the shoulder portion of the mirror carrier.*

*27. The rear view mirror of claim 25, wherein the at least one flange member of the backing plate annularly engages the convex flange member of the mirror carrier.*

*28. The rear view mirror of claim 25, wherein the at least one rib member of the backing plate is positioned on an inner surface of the backing plate.*

*29. The rear view mirror of claim 25, wherein the at least one flange member of the backing plate includes an inwardly facing portion for snap fittingly engaging the convex flange of the mirror carrier.*

*30. The rear view mirror of claim 25, wherein the shoulder portion of the mirror carrier is recessed inboard of an outermost surface of the convex flange member of the mirror carrier.*

*31. The rear view mirror of claim 25, wherein the convex flange member of the mirror carrier is annular.*

*32. The rear view mirror of claim 25, wherein the shoulder portion of the mirror carrier is positioned radially inboard of an outermost surface of the convex flange member of the mirror carrier.*

*33. The rear view mirror of claim 25, wherein the convex flange member of the mirror carrier is positioned radially outboard of an outermost surface of the shoulder portion of the mirror carrier.*

*34. The rear view mirror of claim 25, further comprising a pivot for pivotally supporting the mirror carrier on the mounting platform for angular movement relative to the case.*

*35. The rearview mirror of claim 25, further comprising a retainer for retaining the reflective member in a desired orientation relative to the case.*

*36. A rear view mirror for a motor vehicle comprising:*

*a case containing a mounting platform,*

*a backing plate having at least one rib member and at least one flange member,*

*a reflective member mounted on the backing plate, and*

*a mirror carrier having a shoulder portion and a convex flange member,*

*the at least one flange member on the backing plate being snap fitted on the convex flange on the mirror carrier and the at least one rib member on the backing plate engages the shoulder portion of the mirror carrier during snap fitting,*

*wherein the at least one rib member of the backing plate annularly engages the shoulder portion of the mirror carrier,*

*wherein the at least one flange member of the backing plate annularly engages the convex flange member of the mirror carrier.*

*37. The rear view mirror of claim 36, wherein the at least one rib member of the backing plate is positioned on an inner surface of the backing plate.*

*38. The rear view mirror of claim 36, wherein the at least one flange member of the backing plate includes an inwardly facing portion for snap fittingly engaging the convex flange of the mirror carrier.*

*39. The rear view mirror of claim 36, wherein the shoulder portion of the mirror carrier is recessed inboard of an outermost surface of the convex flange member of the mirror carrier.*

*40. The rear view mirror of claim 36, wherein the convex flange member of the mirror carrier is annular.*

*41. The rear view mirror of claim 36, wherein the shoulder portion of the mirror carrier is positioned radially inboard of an outermost surface of the convex flange member of the mirror carrier.*

*42. The rear view mirror of claim 36, wherein the convex flange member of the mirror carrier is positioned radially outboard of an outermost surface of the shoulder portion of the mirror carrier.*

*43. The rear view mirror of claim 36, further comprising a pivot for pivotally supporting the mirror carrier on the mounting platform for angular movement relative to the case.*

*44. The rear view mirror of claim 36, further comprising a retainer for retaining the reflective member in a desired orientation relative to the case.*

*45. A rear view mirror for a motor vehicle comprising:*

*a case containing a mounting platform,*

*a backing plate having at least one rib member and at least one flange member,*

*a reflective member mounted on the backing plate, and*

*a mirror carrier having a shoulder portion and a convex flange member,*

*the at least one flange member on the backing plate being snap fitted on the convex flange on the mirror carrier and the at least one rib member on the backing plate engages the shoulder portion of the mirror carrier during snap fitting,*

*wherein the shoulder portion of the mirror carrier is positioned radially inboard of an outermost surface of the convex flange member of the mirror carrier,*

*wherein the convex flange member of the mirror carrier is positioned radially outboard of an outermost surface of the shoulder portion of the mirror carrier.*

*46. The rear view mirror of claim 45, wherein the at least one rib member of the backing plate annularly engages the shoulder portion of the mirror carrier.*

*47. The rear view mirror of claim 45, wherein the at least one flange member of the backing plate annularly engages the convex flange member of the mirror carrier.*

*48. The rear view mirror of claim 45, wherein the at least one rib member of the backing plate is positioned on an inner surface of the backing plate.*

*49. The rear view mirror of claim 45, wherein the at least one flange member of the backing plate includes an inwardly facing portion for snap fittingly engaging the convex flange of the mirror carrier.*

*50. The rear view mirror of claim 45, wherein the shoulder portion of the mirror carrier is recessed inboard of an outermost surface of the convex flange member of the mirror carrier.*

*51. The rear view mirror of claim 45, wherein the convex flange member of the mirror carrier is annular.*

*52. The rear view mirror of claim 45, further comprising a pivot for pivotally supporting the mirror carrier on the mounting platform for angular movement relative to the case.*

*53. The rear view mirror of claim 45, further comprising a retainer for retaining the reflective member in a desired orientation relative to the case.*

*54. A rear view mirror for a motor vehicle comprising:*

*a case containing a mounting portion;*

*a backing plate including an annular flange and an engagement rib portion;*

*a reflective member attached to the backing plate; and*

*a mirror carrier including a convex outer portion and having a radially extending engagement surface, the convex outer portion nesting into the annular flange in the mirror carrier, and the backing plate being held together by a snap fit at an outer periphery of the convex outer portion; the snap fit causing engagement between the engagement surface and the engagement rib portion during snap fitting of the backing plate onto the mirror carrier.*

*55. The rear view mirror of claim 54 wherein the mirror carrier includes a socket for receiving a ball end of a jacking member used to adjust the angular orientation of the mirror carrier.*

*56. The rear view mirror of claim 54 wherein the mirror carrier includes a mirror drive mechanism comprising a pair of motors, a pair of sockets attached to the carrier, a pair of jacking members having a ball end portion for engaging the sockets, and a pair of motors operatively coupled to the jacking member for driving the mirror carrier to adjust the angle of the reflective member.*

*57. The rear view mirror of claim 56 wherein the jacking members are jacking screws.*

*58. The rear view mirror of claim 54 further including an element on the mirror carrier having a concave hemispherical surface which pivotally seats in a concentric mating surface formed in a portion of the mounting portion for providing pivoting of the mirror carrier.*

*59. The rear view mirror of claim 58 wherein the mounting portion includes at least one pillar extending therefrom and the mirror drive mechanism is mounted to the mounting portion by securing the drive mechanism to the pillar.*

*60. The rear view mirror of claim 59 wherein the mounting portion includes three pillars and the drive mechanism is mounted to the three pillars.*

*61. The rear view mirror of claim 58 wherein the sockets are attached to a side parallel to but opposite of the reflective member.*

*62. The rear view mirror of claim 60 wherein the drive mechanism is mounted to the pillars using screws.*

*63. A rear view mirror for a motor vehicle comprising:*

*a case containing a mounting platform,*

*a backing plate having at least one rib member and at least one flange member,*

*a reflective member mounted on the backing plate, and*

*a mirror carrier having a shoulder portion and a convex flange member,*

*the at least one flange member on the backing plate being snap fitted on the convex flange on the mirror carrier and the at least one rib member on the backing plate engages the shoulder portion of the mirror carrier during snap fitting,*

*wherein the mirror carrier includes a socket for receiving a ball end of a jacking member used to adjust the angular orientation of the mirror carrier,*

*wherein the mirror carrier includes a mirror drive mechanism comprising a pair of motors, a pair of sockets attached to the carrier, a pair of jacking members having a ball end portion for engaging the sockets, and a pair of motors operatively coupled to the jacking member for driving the mirror carrier to adjust the angle of the reflective member,*

*wherein the jacking members are jacking screws,*

*an element on the mirror carrier having a concave hemispherical surface which pivotally seats in a concentric mating surface formed in a portion of the mounting portion for providing pivoting of the mirror carrier,*

*wherein the mounting portion includes at least one pillar extending therefrom and the mirror drive mechanism is mounted to the mounting portion by securing the drive mechanism to the pillar,*

*wherein the mounting portion includes three pillars and the drive mechanism is mounted to the three pillars,*

*wherein the sockets are attached to a side parallel to but opposite of the reflective member,*

*wherein the drive mechanism is mounted to the pillars using screws.*

* * * * *